March 26, 1957  F. D. SAWYER  2,786,364
TRACTOR TOP LINK
Filed March 30, 1953
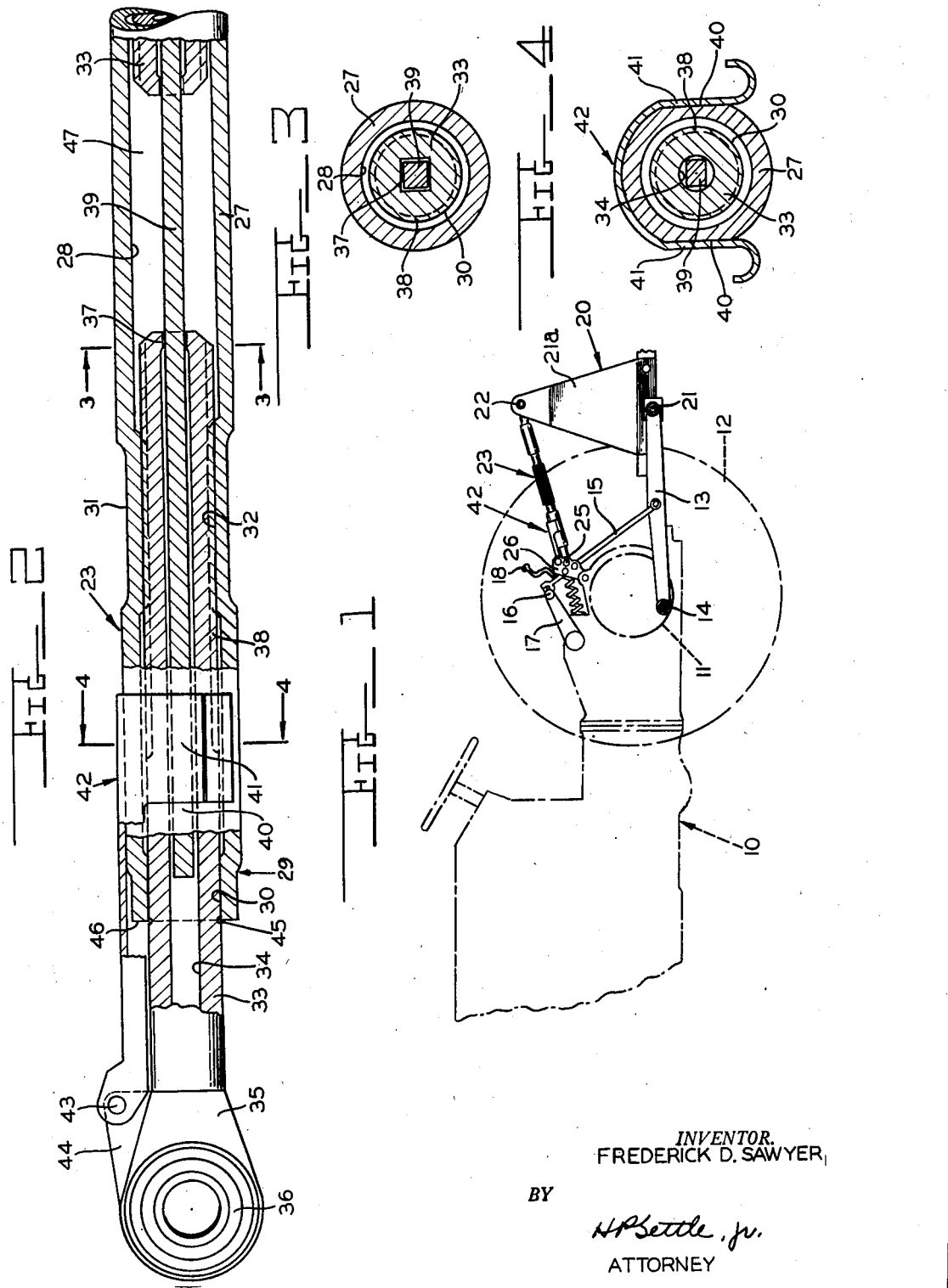
INVENTOR.
FREDERICK D. SAWYER,
BY
H P Settle, Jr.
ATTORNEY

United States Patent Office 2,786,364
Patented Mar. 26, 1957

2,786,364

TRACTOR TOP LINK

Frederick D. Sawyer, Birmingham, Mich., assignor, by mesne assignments, to Ford Motor Company, Dearborn, Mich., a corporation of Delaware Application March 30, 1953, Serial No. 345,391

5 Claims. (Cl. 74—586)

The present invention relates to a tractor link and more particularly to a tractor-implement connecting link of variable length.

As had been pointed out in the earlier filed, copending application of Ralph C. Frevik, Walter W. Sewell, and Raymond W. Wilson, Serial No. 286,222 filed May 5, 1952 and assigned to the assignee of the present invention, it is often desirable to change the length of the top link of a three point tractor-implement connection. The link of the present invention is generally similar to that of the above identified application in that it includes a pair of link ends threadedly received by a tubular center housing. The use of a variable length connection makes possible the changing of the pitch of a mounted implement, and an inexpensive, readily accurately adjustable top link has long been needed in the art. Further, it is desirable that the link may be manufactured so that the two link ends always project the same distance beyond the center housing joining the link ends. In this manner, the link may be calibrated to give a constant length when adjusted to a reference indication.

The present invention provides an improved link which is simple, inexpensive, and readily adjustable, and in which means are provided for preventing relative rotation of a pair of link ends threadedly received by and projecting axially beyond a center housing portion.

It is, therefore, an important object of the present invention to provide an improved tractor top link.

Another important object is the provision of a tractor link of variable length having separate, axially removable end portions and provided with means for preventing independent axial movement of the end elements.

It is a further object of the present invention to provide a tractor top link in which separate link ends are threadedly received by a central housing, and wherein the link ends are concurrently axially movable and individual link end movement is prohibited.

Still another object is the provision of a variable length tractor link having a pair of relatively rotatable, axially movable portions and means for selectively interconnecting the portions to prevent undesired relative rotation therebetween, thereby maintaining said link at a constant length.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a diagrammatic representation of a tractor (shown on dotted outline) joined to an implement by an adjustable link of the present invention;

Figure 2 is a longitudinal sectional view of the adjustable link illustrated in Figure 1;

Figure 3 is a sectional view taken along the plane 3—3 of Figure 2; and

Figure 4 is a sectional view taken along the plane 4—4 of Figure 2.

As shown on the drawings:

In Figure 1, reference numeral 10 refers to a well known type of tractor having a centrally located, laterally extending rear axle housing 11 joining rear wheels 12 and carrying rearwardly extending lower draft links 13 pivotally joined to the housing at their forward ends, as at 14. It is well known that a pair of such lower links 13 are provided and that the lower links are medially pivoted to upwardly and forwardly extending lift arms 15, each of which is pivotally joined at its upper end, as at 16, to a corresponding rock arm 17. One of the lift arms 15 is of variable length, and is provided with a leveling crank 18 by means of which the relative length of the lift arms may be adjusted, and the desired tilt imparted to an implement 20 by varying the relative heights of the trailing ends of the lower links.

The lower links are pivotally connected, as at 21, to the implement 20, and the implement 20 carries an upstanding A-frame 21a. The upper end of the A-frame carries a laterally extending attachment pin 22 pivotally connected to the rear end of an adjustable link 23 of the present invention. The forward end of the link 23 is provided with an attachment bearing 24 (not shown) substantially identical with the bearing received by the pin 22, and the forward bearing 24 is pivoted, as by pin 25, to an attachment clevis 26 pivotally mounted on an upper portion of the rear axle housing 11.

As best illustrated in Figure 2, the link 23 comprises a generally cylindrical center housing 27 having an interior axial bore 28. The ends of the housing 27 are each radially reduced, as indicated at 29, and the interior bore 28 is necked down, as at 30, at each end of the bore. Intermediate the center of the housing and each end 29 thereof the housing is deformed inwardly, as at 31, and the corresponding inwardly deformed bore portions are provided with internal threads 32.

A pair of identical link ends 33 are inserted into each of the open ends of the center housing 27. The link ends are generally cylindrical in configuration and have interior cylindrical recesses 34 formed therein. The free outer ends of the link ends 33 are joined to bearing portions 35, including a segmental spherical bearing socket 36 receiving the attachment bearings 24 heretofore described for receiving the attachment pins 22 and 25.

The interior recesses 34 of each link end 33 are necked down at the interior ends thereof to provide a rectangular aperture 37 communicating with the recesses 34, as best illustrated in Figure 3, and the link ends are provided with exterior threads 38 which are matingly engageable with the interior threads 32 of the housing 27.

An elongated rod 39 of rectangular cross-sectional configuration extends into the recesses 34 of each of the link ends 33. This rod 39 is of a cross-sectional dimension which is slightly smaller than the corresponding dimension of the rectangular apertures 37. The rod 39 is of a length equal to the depth of one recess 34 plus twice the axial dimension of one aperture 37 plus the maximum distance between the link ends 33.

It will be appreciated that when the central housing 27 is rotated, the threaded engagement of the housing threads 32 with the link ends threads 38 will cause telescopic threaded movement of the ends within the housing. The rectangular rod 39 is of such a dimension that it cannot be rotated within the apertures 37 and thus serves to prevent relative rotation between the two link ends 33.

The housing 27 is provided with exterior flat portions 40 (Figure 4) adjacent the forward link end 33. These flat portions 40 are diametrically opposed and are engaged by corresponding flat portions 41 formed on a stamped lock element 42. Lock element 42 snugly conforms to the exterior surface of the housing and it will be understood that the snug engagement of the flat portions 41 and 40 will prevent rotation of the center housing relative to the link end which is held against rotation by the attachment pin 25. The lock element 42 is pivotally connected, as by pivot pin 43, to a fixed ear 44 which is rigidly secured to the forward bearing portion of the front link end 33. The lock element may thus be pivotally moved to and from engagement with the center housing, and engagement of the element 42 with the housing will prevent rotation of the housing relative to the link end, as has been heretofore described.

It will thus be appreciated that the present invention provides a new and novel adjustable link construction for a tractor-mounted implement. Rotation of the center housing 31 is effected by the operator manually grasping the same, thus causing telescopic adjustment of the link ends into and out of the center housing to effect a corresponding adjustment of the overall link length. The polygonal cross-sectional configuration of the rod 39 in engagement with the similarly polygonal apertures 37 prevents relative rotation of the link ends 33, so that when reference mark 45 is in registry with the forward end 46 of the housing 27, the operator may be assured that the link 23 is of predetermined length. The loose, non-rotative fit of the rod 39 within the apertures 37 is sufficient to accommodate tilting of the implement A-frame 21 during implement operation, as by turning the leveling crank 18, without binding of the link ends and without unwinding the center housing upon the link ends. At the same time, the fit between the rod 39 and the apertures 37 is sufficiently snug to prevent relative rotation of the link ends. Also, the loose fit of the rod in the apertures accommodates sliding movement of the rod into the recesses 34 during length adjustment of the link.

The lock 42, when in the position of Figures 2 and 4, prevents any rotation of the center housing relative to the forward link end 33, while at the same time the loose fit of the apertures 37 and the rod 39 accommodates implement tilting. The lock is in a position to be readily manually grasped, so as to be removed from the center housing for link adjustment during implement operation. Since the rod 39 prevents relative rotation of the link ends, and since the lock 42 prevents rotation of the forward link end and the housing, the length of the link cannot accidentally change.

The link 23 provides a central lubrication chamber 47 which may be packed with lubricant and which is in communication with the threads 32 and 38 at each end of the link, so as to assure proper lubrication thereof. The link ends are each supported by the housing at both the engaging thread portions thereof and at the necked down terminal housing portions 29.

It will, of course, be understood that various details of construction may be varied through a wide range without departing from the principles of this invention and it is, therefore, not the purpose to limit the patent granted hereon otherwise than necessitated by the scope of the appened claims.

I claim:

1. In a tractor-implement linkage, a variable length link comprising a pair of link ends each having an attachment bearing for respective attachment to the tractor and the implement, said ends having axially aligned polygonal apertures and exterior threads, a center housing having a central bore provided with interior threads and axially receiving said link ends in axially spaced interengaging relation, the interengaging housing-end threads accommodating axial adjustment of said link ends upon rotation of said housing, and an elongated polygonal joining element projecting axially between said link ends and extending into said polygonal apertures to prevent relative rotation of said link ends while accommodating axial adjustment thereof by relative sliding movement therein.

2. In a tractor-implement linkage of the three-point suspension type, an adjustable top link comprising separate link ends attachable to a tractor and an implement, respectively, and having exterior threads, an internally threaded tubular housing receiving said link ends in the opposite ends thereof, said link ends having rectangular apertures therein communicating with interior recesses, and an elongated rod of rectangular configuration extending between said link ends interiorly of said housing and loosely but non-rotatively projecting into said link end recesses through said apertures, the non-rotative fit of said rod in said apertures preventing relative rotation of said link ends while the loose fit thereof accommodates axial rod-link end movement and tilting of the implement relative to the tractor.

3. An adjustable tractor-implement link, comprising an open-ended tubular center housing, a pair of link ends telescopically received by and projecting axially beyond each end of said center housing, said housing having an axial bore communicating with axially aligned recesses in said link ends, means for attaching said link ends, respectively, to a tractor and to an implement, means projecting freely through said housing bore and non-rotatably engaging said link end recesses to prevent relative rotation between said link ends, and interengaging threads formed in said center housing and at least one of said link ends to effect relative housing-end rotation and axial adjustment thereof to vary the length of said link.

4. In an adjustable tractor-implement link including separate link ends attachable to a tractor and an implement, respectively, and threadedly received by a tubular center housing, means for preventing relative rotation of said link ends, including a polygonal rod projecting axially of said link and means on said link ends non-rotatably engaging said rod and accommodating axial sliding movement of the rod during relative threaded movement of said housing and said ends.

5. In a tractor-implement linkage including an adjustable top link having separate link ends attachable to a tractor and an implement, respectively, and threadedly received by a tubular center housing, the improvements which comprise a polygonal rod extending axially of the link, means on the link ends non-rotatably engaging said rod to prevent independent rotation of the link ends, and locking means joining one of said link ends to the housing to prevent relative rotation therebetween, thus rigidly locking the housing and both link ends against rotation to prevent accidental variations in the length of said link.

References Cited in the file of this patent

UNITED STATES PATENTS

| 818,639 | Price | Apr. 24, 1906 |
| 1,061,060 | Ford | May 6, 1913 |
| 1,376,383 | La Monte | Apr. 26, 1921 |

FOREIGN PATENTS

| 401,601 | France | Sept. 6, 1909 |